United States Patent
Cann et al.

(10) Patent No.: US 8,129,484 B2
(45) Date of Patent: Mar. 6, 2012

(54) BLOW MOLDING POLYETHYLENE RESINS

(75) Inventors: Kevin J. Cann, Rocky Hills, NJ (US); Ronald S. Eisinger, Charleston, WV (US); Mark G. Goode, Hurricane, WV (US); John H. Moorhouse, Kendall Park, NJ (US); Cliff R. Mure, Hillsborough, NJ (US); Stephen P. Jaker, Woodbridge, NJ (US); Maria A. Apecetche, Bridgewater, NJ (US)

(73) Assignee: Univation Technologies, LLC, Houston, TX (US)

( * ) Notice: Subject to any disclaimer, the term of this patent is extended or adjusted under 35 U.S.C. 154(b) by 508 days.

(21) Appl. No.: 11/988,712

(22) PCT Filed: Jul. 21, 2006

(86) PCT No.: PCT/US2006/028160
§ 371 (c)(1),
(2), (4) Date: Apr. 20, 2009

(87) PCT Pub. No.: WO2007/015927
PCT Pub. Date: Feb. 8, 2007

(65) Prior Publication Data
US 2009/0215970 A1 Aug. 27, 2009

Related U.S. Application Data

(63) Continuation-in-part of application No. 11/190,481, filed on Jul. 27, 2005, now abandoned.

(51) Int. Cl.
*C08F 2/00* (2006.01)
*C08F 4/72* (2006.01)
*C08F 4/06* (2006.01)

(52) U.S. Cl. ............... 526/65; 526/108; 526/130
(58) Field of Classification Search ............... 526/65, 526/108, 130
See application file for complete search history.

(56) References Cited

U.S. PATENT DOCUMENTS

| | | | |
|---|---|---|---|
| 2,825,721 A | 3/1958 | Hogan et al. | 260/88.1 |
| 3,622,521 A | 11/1971 | Hogan et al. | 252/430 |
| 3,779,712 A | 12/1973 | Calvert et al. | 23/288 |
| 3,970,613 A | 7/1976 | Goldie et al. | 526/104 |
| 4,011,382 A | 3/1977 | Levine et al. | 526/96 |
| 4,376,191 A | 3/1983 | Geck | |
| 4,460,756 A | 7/1984 | McDaniel et al. | |
| 4,517,345 A | 5/1985 | Eve et al. | 526/105 |

(Continued)

FOREIGN PATENT DOCUMENTS

EP 0562203 9/1993

(Continued)

OTHER PUBLICATIONS

Letter from Dr. Held of May 21, 2008 related to EP equivalent.

(Continued)

*Primary Examiner* — William Cheung

(57) ABSTRACT

Disclosed herein are various processes, including continuous fluidized-bed gas-phase polymerization processes for making a high strength, high density polyethylene copolymer, comprising (including): contacting monomers that include ethylene and optionally at least one non-ethylene monomer with fluidized catalyst particles in a gas phase in the presence of hydrogen gas at an ethylene partial pressure of 100 psi or more and a polymerization temperature of 120° C. or less to produce a polyethylene copolymer having a density of 0.945 g/cc or more and an ESCR Index of 1.0 or more wherein the catalyst particles are prepared at an activation temperature of 700° C. or less, and include silica, chromium, and titanium.

22 Claims, 1 Drawing Sheet

U.S. PATENT DOCUMENTS

| | | | |
|---|---|---|---|
| 4,540,755 A | 9/1985 | Mayhew et al. | 526/100 |
| 4,543,399 A | 9/1985 | Jenkins, III et al. | 526/70 |
| 4,564,660 A | 1/1986 | Williams et al. | 526/106 |
| 4,588,790 A | 5/1986 | Jenkins, III et al. | 526/70 |
| 4,621,952 A | 11/1986 | Aronson | 406/138 |
| 4,803,251 A | 2/1989 | Goode et al. | 526/59 |
| 4,933,149 A | 6/1990 | Rhee et al. | 422/131 |
| 4,994,534 A | 2/1991 | Rhee et al. | 526/88 |
| 5,166,279 A | 11/1992 | Speakman | 526/97 |
| 5,200,477 A | 4/1993 | Baker et al. | 526/74 |
| 5,473,027 A | 12/1995 | Batchelor et al. | 526/106 |
| 5,539,076 A | 7/1996 | Nowlin et al. | 526/348.1 |
| 5,965,675 A | 10/1999 | Kellum et al. | 526/82 |
| 6,022,933 A | 2/2000 | Wright et al. | 526/68 |
| 6,482,901 B1 | 11/2002 | Debras | 526/113 |
| 6,627,713 B2 | 9/2003 | Bernier et al. | 526/137 |
| 2001/0007894 A1 | 7/2001 | Bergmeister et al. | |
| 2002/0042482 A1* | 4/2002 | Monoi et al. | 526/106 |
| 2007/0027276 A1 | 2/2007 | Cann et al. | 526/95 |
| 2010/0160580 A1 | 6/2010 | Cann et al. | |

FOREIGN PATENT DOCUMENTS

| | | |
|---|---|---|
| EP | 0562204 | 9/1993 |
| EP | 0562205 | 9/1993 |
| EP | 0 640 625 A2 * | 3/1995 |
| EP | 0640625 A2 | 3/1995 |
| EP | 0435515 | 1/1997 |
| EP | 0870773 | 10/1998 |
| EP | 0962469 | 12/1999 |
| EP | 1172381 | 1/2002 |
| EP | 1207170 | 5/2002 |
| EP | 0882743 | 11/2003 |
| EP | 1240212 | 4/2005 |
| EP | 1303546 | 8/2006 |
| JP | 2004-091739 | 3/2004 |
| WO | 94/13708 | 6/1994 |
| WO | 99/12982 | 3/1999 |
| WO | 01/30871 | 5/2001 |
| WO | 01/77191 | 10/2001 |
| WO | 01/87997 A1 | 11/2001 |
| WO | 02/40556 | 5/2002 |
| WO | 02/42341 | 5/2002 |
| WO | 2004/060923 | 7/2004 |
| WO | 2004/094489 | 11/2004 |

OTHER PUBLICATIONS

Letter—Observations Filed w/EPO by Dr. Held of Patentanwalte Hosenthien-Held und Dr. Held Jul. 16, 2010.

Ermakov et al., "Transfer Process During Polymerization of a Chromium Oxide Catalyst, II, The Role of Impurities in Transfer Reaction," Kinetika I Kataliz (USSR), vol. 10, No. 2, (1969).

Letter from Dr. Held of Feb. 24, 2009 related to EP cited art (US 5022933).

Japanese Industrial Standard, Testing Methods for Polyethylenes, JIS K 6760-1981 Edition 5 (Reaffirmed: 1992), pp. 1-26. Pub. Japanese Standards Association.

* cited by examiner

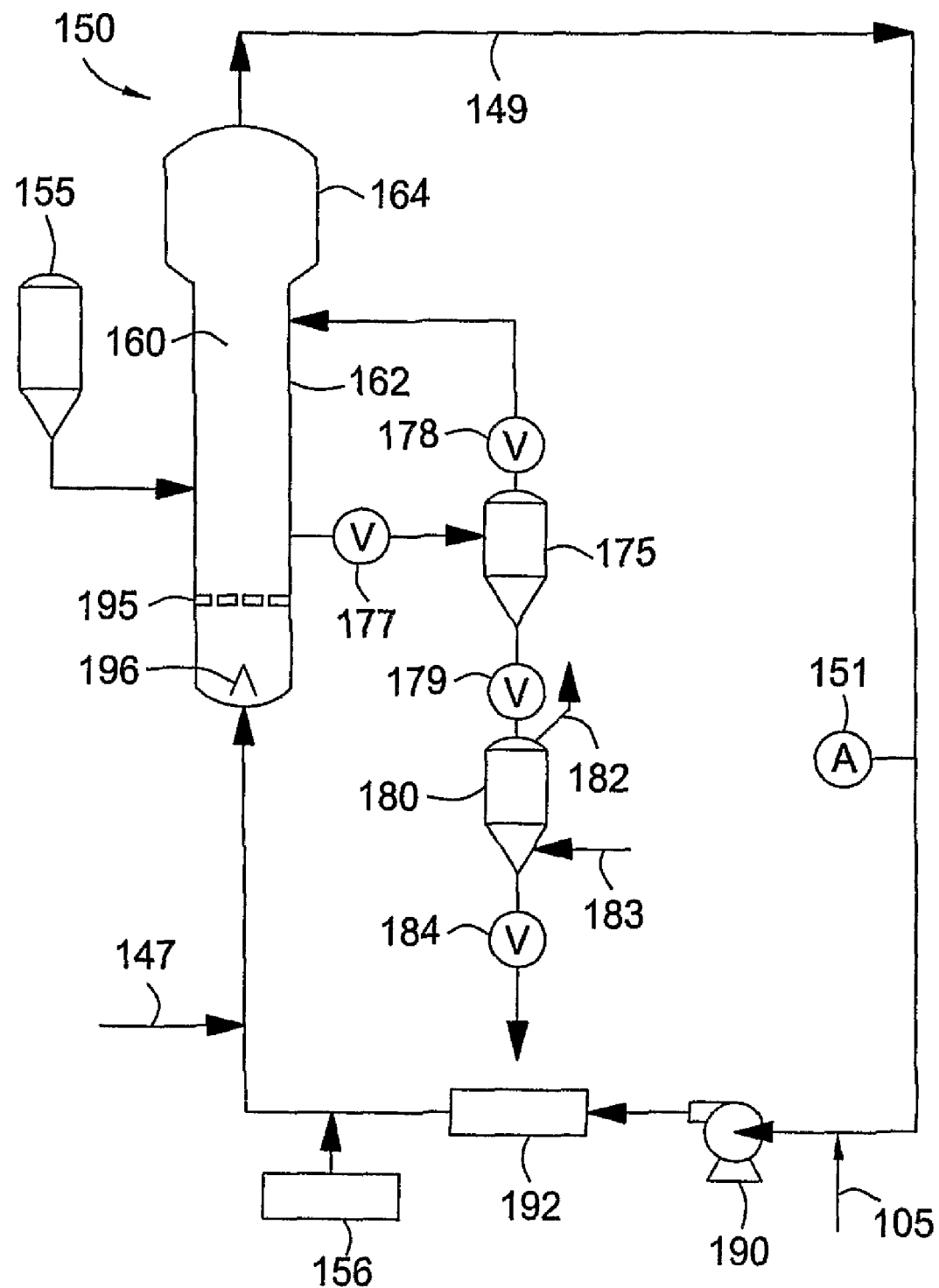

BLOW MOLDING POLYETHYLENE RESINS

This application is a National Stage entry under 36 U.S.C. 371 of International Application No. PCT/US2006/028160, filed Jul. 21, 2006, and is a continuation-in-part of Ser. No. 11/190,481, filed Jul. 27, 2005 (abandoned), the disclosures of which are incorporated by reference in their entireties.

FIELD OF INVENTION

This patent is related to polyethylene resins and continuous fluidized-bed gas-phase polymerization processes for making polyethylene resins.

BACKGROUND

The manufacture of polyethylene resins in a fluidized-bed gas phase process has been the subject of a great deal of development effort and expense.

One of the problems in using a fluidized-bed gas phase process to form polyethylene resins is making a resin with desirable properties, particularly properties appropriate for blow molding purposes, while still having a high productivity and avoiding production problems, e.g., sheeting and the like. Therefore, it would be desirable to obtain a resin product with desirable properties, e.g., sufficiently high Environmental Stress Crack Resistance (ESCR) and proper die swell, while also achieving high catalyst productivities, using a fluidized-bed gas phase process.

U.S. Pat. No. 5,166,279 refers to processes for the gas phase co-polymerization of ethylene, in which polyethylene resins are formed. However, the processes disclosed in that patent are said to provide products with reduced die swell, in contrast with the processes herein, which provide polyethylene resins with increased die swell. Also, the disclosed ESCR levels are low in relation to the densities of the resins. That is, the ESCR Index (described below) is below 1.0. Further still, the disclosed catalyst productivities for low reactor temperatures are low.

Processes for gas phase polymerization of ethylene are disclosed in WO 01/77191 but neither ESCR nor die swell is discussed.

Other background references include U.S. Pat. Nos. 2,825,721, 3,622,521, 3,779,712, 3,970,613, 4,011,382, 4,517,345, 4,540,755, 4,543,399, 4,564,660, 4,588,790, 4,621,952, 4,803,251, 4,933,149, 4,994,534, 5,965,675, 6,482,901, and 6,627,713; U.S. Patent Application Publication No. 2002/0042482; EP 0 562 203 A, EP 0 562 204 A, EP 0 562 205 A, EP 0 640 625 A, EP 0 870 773 A, EP 1 207 170 A, EP 1 240 212 A, and EP 1 303 546 A; WO 2001/30871, WO 2002/40556, WO 2002/42341, WO 2004/060923, and WO 2004/094489; and JP 2004-091739.

SUMMARY

Disclosed herein are various processes, including continuous fluidized-bed gas-phase polymerization processes for making a high strength, high density polyethylene copolymer, comprising (including): contacting monomers that include ethylene and optionally at least one non-ethylene monomer with fluidized catalyst particles in a gas phase in the presence of hydrogen gas at an ethylene partial pressure of 100 psi or more and a polymerization temperature of 120° C. or less to produce a polyethylene copolymer having a density of 0.945 g/cc or more and an ESCR Index of 1.0 or more wherein the catalyst particles are prepared at an activation temperature of 700° C. or less, and include silica, chromium, and titanium.

Also disclosed herein are continuous fluidized-bed gas-phase polymerization processes for making a high strength, high density polyethylene copolymer, comprising: contacting monomers that include ethylene and optionally at least one non-ethylene monomer with fluidized catalyst particles in a gas phase in the presence of hydrogen gas at an ethylene partial pressure of 100 psi or more and a polymerization temperature of 120° C. or less to produce a polyethylene copolymer having a density of 0.945 g/cc or more, an ESCR Index of 1.0 or more, and a Die Swell of from 80% to 100%, wherein the catalyst particles are prepared at an activation temperature of 700° C. or less, and include silica, chromium, and titanium.

Also disclosed is a continuous gas-phase polymerization process for making a high strength, high density polyethylene copolymer, comprising: contacting monomers that include ethylene and optionally at least one non-ethylene olefin with fluidized catalyst particles in a gas-phase fluidized-bed reactor in the presence of hydrogen gas at an ethylene partial pressure of 100 psi or more and a polymerization temperature of 120° C. or less to produce a polyethylene copolymer having a density of from 0.945 to 0.960 g/cc and an ESCR Index of 1.0 or more, wherein:

(a) the catalyst particles include a silica support that is porous and has a surface area of less than 400 square meters per gram;

(b) the catalyst particles have been prepared by contacting the silica support with a chromium compound in a vessel; raising the internal temperature of the vessel containing the dried particles and dry air to a final activation temperature of 650° C. or below; maintaining the activation temperature for a period of from 4 to 8 hours to form activated catalyst particles; lowering the internal temperature of the vessel containing the activated catalyst particles; removing air from the vessel using dry nitrogen; and (c) the polyethylene resin is formed at a polymerization temperature of 120° C. or less;

(d) the polyethylene resin is formed with a bulk density of 20 lb/ft3 or more;

(e) the polyethylene resin has an ESCR Index of 1.0 or more;

(f) the polyethylene resin has a density of from 0.945 to 0.960 g/cc;

(g) the polyethylene resin has a Molecular Weight Distribution of from 15 to 30.

In any of the previous embodiments, the catalyst of the catalyst particles or the catalyst particles may consist essentially of silica, chromium, and titanium.

In any of the previous embodiments, the precursor(s) of the catalyst of the catalyst particles or precursor(s) of the catalyst particles is/are not contacted with an alkylaluminum compound such as a trialkylaluminum compound, i.e. triethylaluminum, to form the catalyst of the catalyst particles or the catalyst particles.

In any of the previous embodiments, the catalyst of the catalyst particles or the catalyst particles are not activated by a cocatalyst such as with an alkylaluminum compound such as a trialkylaluminum compound, i.e. triethylaluminum. Conversely, in any of the previous embodiments, the catalyst of the catalyst particles or the catalyst particles are heat activated as described in more detail herein.

BRIEF DESCRIPTION OF DRAWINGS

FIG. 1 is a flow diagram of a process for making polyethylene resin.

DETAILED DESCRIPTION

A detailed description now follows, for purposes of enabling a person having ordinary skill in the art of making polyethylene to make and use the claimed invention, without undue experimentation. Various terms as used herein are defined below. To the extent a term used in a claim is not defined below, or elsewhere herein, it is given the broadest definition persons in the pertinent art have given that term based on any definition or usage of the term in one or more printed publications or issued patents, including any dictionary definitions.

In specific embodiments, some of which are described below, polyethylene resins are obtained by particular polymerization processes in which specific ingredients and processing conditions are used. For example, a polyethylene resin having improved properties (e.g., high Environmental Stress Crack Resistance (ESCR) and desirable Die Swell) can be obtained by directly contacting monomers that include ethylene and other comonomers (e.g., hexene) in a fluidized bed reactor, in the presence of oxygen and hydrogen, at a high ethylene partial pressure (e.g., 100 psi and preferably higher) using a polymerization temperature (e.g., less than 120° C., or less than 118° C., or less than 116° C., or less than 115° C., or less than 114° C., or less than 113° C., or less than 112° C., or less than 111° C., or less than 110° C., or less than 109° C., or less than 108° C., or less than 107° C., or less than 106° C., or less than 105° C.) with a particular catalyst that (a) includes titanium together with a low amount of chromium (less than 1.0 wt % and preferably 0.50 wt % or lower), (b) is supported by a porous support particle that consists essentially of silica, (c) has a low surface area (less than 400 square meters per gram) and (d) is activated in a specific way that includes careful control of activation temperature, which includes using an activation temperature within a particular range, e.g., greater than 450° C. but less than 700° C. or 650° C. and preferably a narrower range, as specified below. Those of skill in the art will appreciate that as less and less comonomer (e.g. hexene) is incorporated in a polymerization, that is as the polymer product approaches and reaches homopolymer, the temperature of the reaction will generally rise. A polyethylene resin can be produced having superior properties, particularly a polyethylene useful for blow molding purposes. At least one of the superior properties is an ESCR Index that is substantially higher than when certain elements are not utilized, as demonstrated in the examples below. Furthermore, the polyethylene resin is produced at high productivities, e.g., 5000 lb/lb and greater (i.e., pounds of polymer per pound of catalyst).

At least one of the enhancements offered by the processes described herein is providing a polyethylene having a superior ESCR at given density, preferably a density within any of the ranges specified herein. It is generally recognized that ESCR tends to be inversely proportional (albeit not a straight line relationship) to density, so that ESCR tends to generally be higher as resin density decreases. With the processes herein, however, high ESCR is achieved even where the density of the polyethylene resin is relatively high. That is, forming higher density resins results in less of a decrease in ESCR. This improvement in ESCR performance can be characterized herein by the ESCR Index, a parameter defined below. Also, with the processes herein, the resulting polyethylene resins have superior Die Swell levels. For example, increasing ESCR can tend to lower Die Swell. In other processes, a polyethylene resin Die Swell often suffers at certain ESCR levels. But with the processes herein, a Die Swell of 80% and even higher is obtainable, e.g., 80% and above, or 85% and above, or 90% and above, or 95% and above, where the desirable upper limit for Die Swell is 100%.

One of the features of successful operation of the process is utilizing a combination of relatively low activation temperature for the catalyst and relatively low polymerization temperature. It is important, for example, that the process use a catalyst prepared with a particular activation temperature. It has been discovered, for example, that using an activation temperature higher than a certain level, e.g., higher than about 650° C., or higher than about 700° C., or higher than about 750° C., can lead to catalysts having a detrimental effect on the polymer produced in the gas phase process, e.g., leading to a polymer with narrower molecular weight distributions than desired, along with lower-than-desirable ESCR values. On the other hand, an activation temperature that is too low, e.g., lower than about 475° C., or lower than about 450° C., can lead to catalysts with low productivities. In certain embodiments, we have discovered that a lower activation temperature (lower than about 600° C.) seems to permit higher polymerization temperatures, while maintaining excellent ESCR and ESCR Index. But controlling catalyst activation temperature is not necessarily enough, as demonstrated by the experimental results below, and other factors are desirably be implemented, including providing certain process conditions, preferably high ethylene partial pressures and low polymerization temperatures. As demonstrated by the Examples, it is the right combination of the various factors that leads to the best results.

In order to minimize the process steps and complexity, it is advantageous that the final product (i.e., the polyethylene having the desired properties) be produced as a result of directly contacting the monomers with the catalyst particles described herein, e.g., in a single vertical reactor vessel as shown in FIG. 1, as opposed to first contacting the monomers with catalyst particles in one reactor vessel to form a prepolymer, then transferring that prepolymer to a different reactor to form the final polymer. Also, the material that enters the vertical reactor vessel preferably experiences a decrease in velocity when it passes from the section with low cross-sectional area to the section with high cross-sectional area. The catalyst, which is supported on porous silica, includes both titanium and chromium, and the catalyst has low amounts of chromium, e.g., lower than 1.0 wt %, or $\leq$0.7 wt %, or $\leq$0.5 wt %, or $\leq$0.30 wt %. Preferably, the amount of chromium is less than 1.0 wt %. When combined with other factors, the polymerization described herein may be less likely to experience agglomeration and sheeting when the catalyst particles that are making direct contact with the monomers are loaded with such low levels of chromium, particularly less than 1.0 wt %, or less than 0.50 wt %, or even lower.

In one embodiment, the catalyst is prepared, not only using low activation temperature, but also according to a controlled procedure, exemplified by the following. A suitable chromium compound can be deposited on a suitable support, usually in aqueous solution. The support can be dried to reduce or eliminate water before the support, a suitable titanium compound and a suitable liquid are mixed together. The support can be dried to remove the liquid and deposit the titanium compound on the support. Then, the support containing chromium and titanium compounds can be heated in a suitable heated vessel, first in nitrogen at lower temperatures, then in an oxygen containing material (e.g. air or pure oxygen) at a suitable higher temperature for a suitable time.

Also, it is preferred that the polymerization be conducted at a high ethylene partial pressure, e.g., at ethylene partial pressure of ≧100 psi; or ≧150 psi; or ≧200 psi, or ≧250 psi, or ≧300 psi. Furthermore, productivities ≧4000 lb/lb, or ≧4500 lb/lb, ≧5000 lb/lb, or ≧5500 lb/lb, or ≧6000 lb/lb, or ≧6500 lb/lb, or ≧7000 lb/lb, are a preferred aspect of the process described herein in gas-phase polymerization fluid bed systems, preferably having a residence time of ≧2 hours, or ≧2.5 hours, or ≧3 hours, or ≧3.5 hours, at the abovementioned ethylene partial pressures.

Furthermore, to achieve a polyethylene with a satisfactory ESCR, when comonomer is used, the preferred comonomers are 1-butene, 1-hexene, or 1-octene, or mixtures thereof.

Different specific embodiments of the processes, some of which are set forth in certain claims, include (but are not limited to) the following:

In one or more of the processes disclosed herein, the ESCR Index of the polyethylene resin can be at various levels above 1.0, e.g., 1.1 or above; or 1.2 or above; or 1.3 or above; or 1.4 or above; or 1.5 or above; or 1.6 or above; or 1.7 or above; or 1.8 or above; or 1.9 or above; or 2.0 or above; or 2.5 or above; or 2.8 or above, and such ESCR Index levels can be combined with any of the measured ESCR levels and densities disclosed herein.

In at least one specific embodiment, the density of the polyethylene copolymer ranges from 0.950 to 0.965 g/cc.

In one or more of the processes described herein, the raising of the internal temperature of the vessel containing the dried particles to a final activation temperature, e.g, of 650° C. (of any of the other activation temperatures identified herein) includes raising the internal temperature of the vessel containing the dried particles and dry air at a rate of from 25 to 55° C. per hour to the final activation temperature and the polyethylene resin is formed at any of the polymerization temperatures described herein, e.g., 100° C. or less.

In one or more of the processes described above or elsewhere herein, the Percent Die Swell (Die Swell) of the polyethylene resin can range from 80% to 100%, such as 80% or more; or 85% or more; or 90% or more; or 95% or more, all with a preferred upper limit of 100%. Examples of Die Swell ranges are 81% and above; or 83% and above; or 85% and above In one or more of the processes described above or elsewhere herein, the supported catalyst particles are prepared using an activation temperature of 650° C. or less; or less than 650° C.; or 600° C. or less; or 550° C. or less; or 500° C. or less.

In one or more of the processes described above or elsewhere herein, the ESCR of the polyethylene resin (10% Igepal) is 47 hours or more; or ≧48 hours; or ≧50 hours; or ≧52 hours; or ≧54 hours; or ≧56 hours; or ≧58 hours; or ≧70 hours; or ≧80 hours; or ≧100 hours.

In one or more of the processes described above or elsewhere herein, the chromium in the catalyst is present in the amount of less than 1.0 wt %; or ≦0.7 wt %; or ≦0.5 wt %; or ≦0.3 wt %.

In one or more of the processes described above or elsewhere herein, the non-ethylene monomer is 1-butene, 1-hexene, or 1-octene, or mixtures thereof.

In one or more of the processes described above or elsewhere herein, the ethylene partial pressure is 100 psi ethylene or greater; or 125 psi ethylene or greater; or 150 psi ethylene or greater; or 175 psi ethylene or greater; or 200 psi ethylene or greater; or 250 psi ethylene or greater; or 300 psi ethylene or greater.

In one or more of the processes described above or elsewhere herein, the catalyst productivity is 4000 lb/lb or more; or ≧4500 lb/lb; or ≧5000 lb/lb; or ≧5500 lb/lb; or ≧6000 lb/lb; or ≧6500 lb/lb.

In one or more of the processes described above or elsewhere herein, the catalyst productivity is 4000 lb/lb or more (or any of the productivities identified above) with a residence time of 2 hours or more; or ≧2.5 hours; or ≧3 hours; or ≧3.5; or ≧4 hours.

In one or more of the processes described above or elsewhere herein, the H2/C2 molar ratio in the cycle gas is 0.01 or more; or ≧0.015; or ≧0.02; or ≧0.03; or ≧0.05; or ≧0.10; or ≧0.15; or ≧0.20.

In one or more of the processes described above or elsewhere herein, the monomers are directed through one or more reactors that include at least a first section having a first diameter and a second section having a second diameter, wherein the second diameter is larger than the first diameter.

In one or more of the processes described above or elsewhere herein, oxygen is present in the range of about 10 to 500 ppbv based on the ethylene feed rate.

In one or more of the processes described above or elsewhere herein, the surface area of the catalyst support is less than 400 square meters per gram, or ≦400 square meters per gram; or ≧360 square meters per gram.

In one or more of the processes described above or elsewhere herein, the polyethylene resin is formed with a bulk density of 20 lb/ft³ or more; or ≧23 lb/ft³; or ≧25 lb/ft³; or ≧27 lb/ft³.

In one or more of the processes described above or elsewhere herein, the polymerization is conducted in the presence of trialkyl aluminum such as triethyl aluminum (TEAl).

Catalyst Preparation

Certain claims refer to a catalyst that includes chromium and titanium. Catalysts containing chromium and titanium, useful for making the polyethylene resins herein, are exemplified by the catalysts described in U.S. Pat. No. 4,011,382, except that fluoride is not used in certain embodiments herein. The text of that patent referring to catalysts and gas phase polymerization is hereby incorporated by reference except that for the catalysts described herein fluoride is not required.

A preferred catalyst for the invention herein is a chromium oxide ($CrO_3$) based catalyst which can be formed, in general, by depositing a suitable chromium compound and a suitable titanium compound on a support, and then activating the resulting composition by heating it in an oxygen containing material (e.g., air or pure oxygen) at a suitable temperature for a suitable time (described below).

The chromium compound and titanium compound can be deposited on the support from solutions thereof and in such quantities as to provide, after the activation step, the desired levels of Cr and Ti in the catalyst. After the compounds are placed on the support and it is activated, there results a powdery, free-flowing particulate material.

The order of the addition of the chromium compound and the titanium compound to the support is not critical but it is preferred that all the components are added before the activation of the composite catalyst, and also that the support is dried to reduce or eliminate water before the titanium compound is added thereto.

After activation, the supported catalyst preferably contains, based on the combined weight of the support and the chromium and titanium therein, (a) about 0.1 to 1.5, and preferably about 0.2 to 1.0, and most preferably 0.3 to 0.7 weight percent of Cr; and (b) about 1.5 to 9.0, and preferably about 3.0 to 5.0, weight percent of titanium.

Chromium compounds. A suitable chromium compound includes $CrO_3$, or any compound of chromium which is ignitable to $CrO_3$ under the activation conditions employed. At least a portion of the chromium in the supported, activated catalyst must be in the hexavalent state. Chromium compounds other than $CrO_3$ are disclosed in U.S. Pat. Nos. 2,825,721 and 3,622,521 (the disclosures of which patents are hereby incorporated for reference) and include chromic acetyl acetonate, chromic nitrate, chromic acetate, chromic chloride, chromic sulfate, and ammonium chromate. Water soluble compounds of chromium, such as $CrO_3$ and chromic acetate, are the preferred compounds for use in depositing the chromium compound on the support from a solution of the compound. Chromium compounds soluble in organic solvents may also be used.

Titanium compounds. Any suitable titanium compound can be used; including particularly those that are ignitable to $TiO_2$ under the activation conditions employed, and includes those disclosed in U.S. Pat. No. 3,622,521 (hereby incorporated by reference) and Netherlands Patent Application 72-10881. These compounds include those having the structures $(R')_n Ti(OR')_m$ and $(RO)_m Ti(OR')_n$ where m is 1, 2, 3 or 4; n is 0, 1, 2 or 3 and m+n=4, and where R is a $C_1$ to $C_{12}$ alkyl, aryl or cycloaryl group, and combinations thereof, and the like, wherein: R' is R, cyclopentadienyl, and $C_2$ to $C_{12}$ alkenyl groups. These compounds also include those having the structures $TiX_4$ wherein X is chlorine, bromine, fluorine or iodine. Accordingly, suitable titanium compounds include titanium tetrachloride, titanium tetraisopropoxide and titanium tetrabutoxide. The titanium compounds are more conveniently deposited on the support from a hydrocarbon solvent solution thereof. The titanium (as Ti) is present in the catalyst, with respect to the Cr (as Cr), in a mole ratio of about 1 to 100, and preferably of about 4 to 18.

Silica supports. An inorganic oxide support is used as a catalyst support, preferably silica. The inorganic oxides are necessarily porous materials, e.g., those with a surface area that is less than 400 square meters per gram, or less than 380, or less than 360 square meters per gram. The inorganic oxides have a particle size ranging from about 10 to 200 microns in one embodiment, and preferably from about 10 to 90 microns. Although silica is the preferred inorganic oxide, it is contemplated that in certain situations, the inorganic oxides may also be (or include) alumina, thoria, zirconia and other comparable inorganic oxides, as well as mixtures of such oxides.

Although any grade of support can be used for use with chromium, one of the preferred silicas is W. R. Grace's 955 grade, or any other silica having a surface area of about 300 square meters per gram, a pore volume of about 1.75 cc per gram, and an average particle size of about 40 microns. A suitable chromium-containing silica has about 0.5 weight percent chromium with a surface area of about 300 square meters per gram, a pore volume of about 1.45 cc per gram, and an average particle size of about 40 microns (e.g. W. R. Grace's 957HS grade).

When using 955 or 957HS grade supports, activation temperatures higher than a certain level, e.g., about 700° C., can lead to catalysts that produce polymer with narrower molecular weight distributions, along with low ESCR values.

Drying. The catalyst support having the chromium deposited thereon are preferably dried to reduce or eliminate water before it is brought into contact with the titanium compound. This can be done by applying heat in a conventional manner, or otherwise drying the catalyst support with a dry, inert gas (e.g., nitrogen) or dry air prior to use. In general, the preferred drying temperature is 140 to 300° C., and a preferred drying time is about 2 to 4 hours, where drying can be conducted by passing a stream of nitrogen through the catalyst support.

Activation. The catalyst activation temperature can be 700° C. or below, but for superior performance are preferably within a range having an upper limit of (i.e., less than or equal to) about 650° C., or 600° C., or 550° C., or 500° C., with a lower limit of (i.e., greater than or equal to) about 350° C., or 400° C., or 450° C., where the range can be selected using any of the combinations of those upper and lower limits. The catalyst activation time at or near the activation temperature is within a range having an upper limit of 10 hours, or 8 hours, or 7 hours, or 6 hours, with a lower limit of 1 hour, or 2 hours, or 3 hours or 4 hours. Additional requirements for activation times are set forth below. However, it has been discovered that, surprisingly, a polyethylene having superior properties can be obtained when a particular range of catalyst activation temperature is used in combination with a particular range of polymerization temperature, in a gas phase environment, e.g., below 750° C., or 700° C., or 650° C., or 600° C. The combination of about 600° C. activation temperature (+/−100° C.) and about 6 hours activation time (+/−30 minutes) is most preferred, although similar combinations based on the temperatures and times above are also beneficial.

Polymerization

Referring to FIG. 1, an illustrative polymerization section 150 can include a reactor 160 in fluid communication with one or more discharge tanks 175 (only one shown), surge tanks 180 (only one shown), and recycle compressors 190 (only one shown). The polymerization section 150 can also include more than one reactor 160 arranged in series, parallel, or configured independent from the other reactors, each reactor having its own associated tanks 175, 180 and compressors 190 or alternatively, sharing any one or more of the associated tanks 175, 180 and compressors 190. For simplicity and ease of description, embodiments of the invention will be further described in the context of a single reactor train.

In one or more embodiments, the reactor 160 can include a reaction zone 162 in fluid communication with a velocity reduction zone 164. The reaction zone 162 can include a bed of growing polymer particles, formed polymer particles and catalyst particles fluidized by the continuous flow of polymerizable and modifying gaseous components in the form of make-up feed and recycle fluid through the reaction zone 162.

Referring now to FIG. 1, a feedstream 105 can be directed to enter the cycle line before the blower but may also be at any point in the polymerization system including to the reactor fluid bed, the expanded section or to the cycle line before or after the cooler as depicted with alternative feedstream location 147. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, I-octene, 1-decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

For the purpose of polymerization with chromium oxide type catalysts, the gas mole ratio of hydrogen to ethylene in the reactor is typically in the range of about 0 to 0.5, more typically in the range of 0.01 to 0.4 and most typically in the range of 0.03 to 0.3. A preferred embodiment includes the addition of hydrogen gas. The use of hydrogen affects the polymer molecular weight and distribution, and ultimately influences the polymer properties.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 162, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone 162 can vary in the range of from about 2:1 to about 5:1. The range, of course, can vary to larger or smaller ratios and depends upon the desired production capacity. The cross-sectional area of the velocity reduction zone 164 is typically within the range of about 2 to about 3 multiplied by the cross-sectional area of the reaction zone 162.

The velocity reduction zone 164 has a larger inner diameter than the reaction zone 162. As the name suggests, the velocity reduction zone 164 slows the velocity of the gas due to the increased cross sectional area. This reduction in gas velocity drops the entrained particles into the bed, allowing primarily only gas to flow from the reactor 160. That gas exiting the overhead of the reactor 160 is the recycle gas stream 149.

The recycle stream 149 is compressed in a compressor 190 and then passed through a heat exchange zone where heat is removed before it is returned to the bed. The heat exchange zone is typically a heat exchanger 192 which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor 160. The cooled recycle stream absorbs the heat of reaction generated by the polymerization reaction.

Preferably, the recycle stream is returned to the reactor 160 and to the fluidized bed through a gas distributor plate 195. A gas deflector 196 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

An activated precursor composition with or without an aluminum alkyl modifier (hereinafter collectively referred to as catalyst) is preferably stored for service in a catalyst reservoir 155 under a blanket of a gas which is inert to the stored material, such as nitrogen or argon. Preferably, the catalyst reservoir 155 is equipped with a feeder suitable to continuously feed the catalyst into the reactor 160. An illustrative catalyst reservoir is shown and described in U.S. Pat. No. 3,779,712, for example. A gas that is inert to the catalyst, such as nitrogen or argon, is preferably used to carry the catalyst into the bed. Preferably, the carrier gas is the same as the blanket gas used for storing the catalysts in the catalyst reservoir 155. In one embodiment the catalyst is a dry powder and the catalyst feeder comprises a rotating metering disk. In another embodiment the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other C3 to C8 alkane. It is possible to modify the catalyst during delivery to the reactor along the feed addition line with the aluminum alkyl modifiers, which are described elsewhere herein.

The catalyst is injected at a point into the bed where good mixing with polymer particles occurs. For example, the catalyst is injected into the bed at a point above the distributor plate 195. Injecting the catalyst at a point above the distribution plate 195 provides satisfactory operation of a fluidized-bed polymerization reactor. Injection of the catalyst into the area below the distributor plate 195 could cause polymerization to begin there and eventually cause plugging of the distributor plate 195. Injection directly into the fluidized bed aids in distributing the catalyst uniformly throughout the bed and tends to avoid the formation of localized spots of high catalyst concentration which can cause "hot spots" to form. Injection of the catalyst into the reactor 160 above the bed can result in excessive catalyst carryover into the recycle line 149 where polymerization could occur leading to plugging of the line 149 and heat exchanger 192.

The modifier compound (e.g., an aluminum alkyl compound, a non-limiting illustrative example of which is triethyl aluminum), can be added to the reaction system either directly into the fluidized bed or downstream of the heat exchanger 192, in which case the modifier is fed into the recycle system from a dispenser 156. The amount of modifier added to the polymerization reactor when using the chromium oxide catalyst and particularly the titanated chromium oxide based catalyst can be, broadly speaking, in the range of about 0.005 to about 10 modifier to chromium on a molar basis, or more narrowly in the range of about 0.01 to 5 and even more narrowly in the range of about 0.03 to 3 and most narrowly in the range of 0.05 to 2.

The polymerization reaction is conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv.

In order to achieve the desired density ranges in the copolymers it is necessary to copolymerize enough of the comonomers with ethylene to achieve a level of about 0 to anywhere from 5 to 10 weight percent of the comonomer in the copolymer. The amount of comonomer needed to achieve this result will depend on the particular comonomer(s) being employed, the activation temperature of the catalyst and its formulation. The ratio of the comonomer to ethylene is controlled to obtain the desired resin density of copolymer product.

A gas analyzer 151 can be used to determine the composition of the recycle stream and the composition of the make-up feedstream stream 105 and 147 can be adjusted accordingly to maintain an essentially steady state gaseous composition within the reaction zone 162. The gas analyzer 151 can be a conventional gas analyzer that determines the recycle stream composition to maintain the ratios of feed stream components. Such equipment is commercially available from a wide variety of sources. The gas analyzer 151 may be positioned to receive gas from a sampling point located between the velocity reduction zone 164 and heat exchanger 192.

The rate of polymer production in the bed depends on the rate of catalyst injection and the concentration of monomer(s) in the reaction zone. The production rate is conveniently controlled by adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from reactor 160, it is desirable and preferable to separate fluid from the product and to return the fluid to the recycle line 149. There are numerous ways known to the art to accomplish this separation. In one or more embodiments, fluid and product leave the reactor 160 and enter the product discharge tanks 175 (one is shown) through valve 177, which may be a ball valve designed to have minimum restriction to flow when opened. Positioned above and below the product discharge tank 175 are conventional valves 178, 179. The valve 179 allows passage of product into the product surge tanks 180 (only one is shown).

In a typical mode of operation, valve 177 is open and valves 178,179 are in a closed position. Product and fluid enter the product discharge tank 175. Valve 177 closes and the product is allowed to settle in the product discharge tank 175. Valve 178 is then opened permitting fluid to flow from the product discharge tank 175 to the reactor 162. Valve 178 is then closed and valve 179 is opened and any product in the product discharge tank 175 flows into the product surge tank 180. Valve 179 is then closed. Product is then discharged from the product surge tank 180 through valve 184. The product can be further purged to remove residual hydrocarbons and conveyed to storage or compounding. The particular timing sequence of the valves 177, 178, 179, 184 is accomplished by the use of conventional programmable controllers, which are well known in the art.

Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting the bed during start up and shut down. The reactor does not require the use of stirring and/or wall scraping. The recycle line 149 and the elements therein (compressor 190, heat exchanger 192) is desirably smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor.

The conditions for polymerizations vary depending upon the monomers, catalysts and equipment availability. The specific conditions are known or readily derivable by those skilled in the art. For example, the temperatures are within the range of from about −10° C. to about 120° C., often about 15° C. to about 110° C. Pressures are within the range of from about 0.1 bar to about 100 bar, such as about 5 bar to about 50 bar, for example. Additional details of polymerization can be found in U.S. Pat. No. 6,627,713, which is incorporated by reference at least to the extent it discloses polymerization details.

Test Methods.

The following test methods should be utilized to obtain the numerical values for certain properties and features as set forth in the claims, e.g. ESCR, density, productivity, chromium content, or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

ESCR values are based on ASTM D1693, condition B. The reagent used is either 10% Igepal CO-630 in water or 100% Igepal CO-630 unless otherwise specified.

As noted above, the ESCR of any polyethylene resin formed by any of the claimed processes herein is higher than the ESCR of polyethylene resins formed by other processes, particularly the gas phase processes disclosed in U.S. Pat. No. 5,166,279 that are carried out in a fluidized bed, provided the two resins being compared for ESCR have the same densities. Generally, for any polyethylene, ESCR tends to be higher for lower density materials. Accordingly, for example, a polyethylene formed with a density of 0.950 g/cc will tend to have a higher ESCR than a polyethylene formed with a density of 0.960 g/cc. Therefore, to make a proper comparison the ESCR needs to be adjusted to accommodate any density difference. That comparison can be achieved using a parameter referred to herein as the "ESCR Index," an empirically derived value that combines measured ESCR of a polyethylene resin with its density. The ESCR Index is defined herein as the measured ESCR (10% Igepal) divided by the product of 0.0481 and $(Density)^{-142}$.

Density values are based on ASTM D1505.

Flow Index ($I_{21}$) values are based on ASTM D1238, run at 190° C., with 21.6 kg weight; the standard designation for that measurement is 190/21.60.

Melt Index ($I_2$) values are based on ASTM D1238, run at 190° C., with 2.16 kg weight; the standard designation for that measurement is 190/2.16.

SEC measurements are provided in accordance with the following procedure, using Polymer Laboratories instrument; Model HT-GPC-220, Columns Shodex, Run Temp: 140° C., Calibration Standard: traceable to NIST, Solvent: 1,2,4 Trichlorobenzene.

The Die Swell ratio $S_r$ is defined as the extrudate diameter divided by the die diameter, $D_e/D_0$, where $D_e$ and $D_0$ are the diameters of the extrudate and die, respectively. The percent die swell (% DS) of the polyethylene compositions was calculated using the following procedure. The compositions were extruded at 190° C. and a shear rate of 997.2 s$^{-1}$. The cylinder of the rheometer used in this experiment has a bore diameter of 9.5504 mm. The piston speed was maintained at 82 mm/min. The polymer was passed at a constant rate through a capillary die 20 mm in length and 1 mm in diameter. The time (t) in seconds to extrude a rod 15.24 cm in length was measured. The swell ratio $S_r$ is calculated as follows:

$$S_r = 0.9044 \cdot \sqrt{t}$$

where t=time to extrude a 15.24 cm rod
The percent die swell (% DS) is defined as $(D_e/D_0-1)*100$.

EXAMPLES

Polyethylene resin samples were prepared using catalysts made using different activation temperatures, and also using different polymerization conditions, as noted in Tables 1 and 2 below. All the examples are blow-molding products produced in a gas-phase, fluidized-bed polymerization pilot reactor. These examples illustrate the improvement in ESCR of a polyethylene resin when using certain catalyst specifications and reaction process conditions.

Catalysts employed in the Examples were prepared as follows. About 500 grams of a porous silica support containing 2.5 weight percent chromium acetate, which amounts to 0.5% Cr content (Grade 957HS chromium on silica, produced by Davison Catalyst division of W. R. Grace and Co) having a particle size of about 40 microns and a surface area of about 300 square meters per gram were dried by passing a stream of nitrogen through it for about 4 hours at about 150° C. About 400 grams of the dried supported chromium compound were then slurried in about 2330 ml of dry isopentane, and then 96 grams of tetraisopropyl titanate were added to the slurry. The system was mixed thoroughly and then isopentane was removed by heating the reaction vessel. The dried material was then transferred to a heating vessel where it was heated under dry nitrogen at 325° C. for about 2 to 4 hours to ensure that all the isopentane was removed and to slowly remove any organic residues from the tetraisopropyl titanate so as to avoid any danger of an explosive mixture within the vessel in the next step. The nitrogen stream was then replaced with a stream of dry air and the catalyst composition was heated slowly at a rate of about 50° C. per hour or 100° C. per hour to the specified "Activation Temperature" (see below) where it was activated for about 6 hours. The activated catalyst was then cooled with dry air (at ambient temperature) to about 300° C. and further cooled from 300° C. to room temperature with dry nitrogen (at ambient temperature). Activation temperature set points of either 550° C., 600° C. or 825° C. were employed. Catalysts made using this procedure and employed in the examples had a composition of about 0.5 wt % chromium and about 3.8 wt % titanium.

The nominal specifications for the product in Examples 1-15 and 17-20 of Tables 1 and 2 were: resin density=0.954 g/cm$^3$, Flow Index $I_{21}$=24. In Example 16 the resin density was raised to 0.957 g/cm$^3$. Product was made continuously in the fluidized-bed reactor. Cycle gas was circulated through the reactor and heat of reaction was removed in a heat exchanger. Catalyst powder was continuously introduced into the fluidized bed. Monomers, hydrogen and oxygen were fed into the cycle gas piping. Product was transferred intermittently into a product chamber, depressurized, degassed briefly, and then discharged into a drum. The drum contained butylated hydroxytoluene, an antioxidant stabilizer, as a temporary storage stabilizer, and was treated with a stream of moist nitrogen. Certain conditions in the fluidized-bed reactor were maintained at a constant value or in a narrow range. Ethylene partial pressure was about 200 psi except for Example 18 in which it was increased to 250 psi. The $H_2/C_2$ molar gas ratio in the cycle gas was maintained at about 0.05. Total reactor pressure was 340-394 psig. Superficial gas velocity within the fluidized bed was 1.3-1.8 ft/s. Average residence time of resin in the reactor ranged from 2.5 to 5 hours. Except for Example 20, triethyl aluminum, diluted in isopentane, was fed continuously into the fluidized bed in the range from 0.17 to 2.8 moles aluminum per mole chromium. Parameters that were changed in the experiments are summarized in Tables 1 and 2.

In Examples 1-8 the catalyst that was used had been activated at 825° C. set point. In those examples, the reactor temperature was maintained at from 105° C. to 106° C. The ESCR of the polymer product, measured in 10 wt % Igepal, had a median failure time $F_{50}$ ranging from 24 to 42 hours and averaging 33 hours. The breadth of the molecular weight distribution was characterized by the dispersity index, defined as the ratio of the weight average molecular weight Mw and the number average molecular weight Mn (Mw/Mn), and the dispersity index for these comparative examples ranged from 9.7 to 11.1. Virtually all of those resin samples had an ESCR Index of less than 1.0.

In Examples 12-17, 19 and 20 the catalyst used had been activated at 600° C. set point. The reactor temperature was between 98° C. and 102° C. The ESCR had a median failure rate ranging from 48 to 80 hours and averaging 55 hours. Note that the resin density in Example 16 was relatively high at 0.957 g/cm$^3$. Surprisingly, ESCR was high, even though ESCR was expected to decrease in conjunction with an increase in resin density. These examples employing low activation temperature catalyst together with lower reactor temperature demonstrated an improvement in ESCR despite being at higher density than other similar products. The dispersity index, Mw/Mn, increased to a range from 17.3 to 26.0 which provided better polymer processability. All of those resin samples had an ESCR Index of 1.0 or more.

In Example 11, the catalyst that was used had been activated at 600° C. set point. However, in that example, the polymerization was carried out at a temperature of 106° C. Oxygen was fed to the reactor during this test to make product with the desired specifications, but the precise amount of added oxygen was not measured. The ESCR median failure time of polymer produced was 30 hours. This example demonstrated that a relatively high reactor temperature, combined with the 600° C. activation temperature with a particular catalyst did not give the desired improved ESCR performance, and that something more was required. A combination of a certain type of catalyst and process conditions was needed to achieve the improved product properties.

In Examples 9 and 10, catalyst activated at 825° C. was used at polymerization reaction temperatures of 101 and 100° C., respectively. The $F_{50}$ 10 wt % Igepal ESCR ranged from 28 to 39 hours as the polymerization temperature was decreased. Examples 9 and 10 exhibited a broadened polymer molecular weight distribution relative to Example 8. This broadening of the MWD was evidenced by the dispersity index, Mw/Mn, of 15.4 and 14.8 for Examples 9 and 10, respectively but was not as extensive as found in the other examples. These results showed that high ESCR products were not obtained when the certain process conditions were used with catalysts activated at unduly high temperatures.

Further improvements to the ESCR were demonstrated in Examples 13 and 17 with catalyst activated at 600° C. setpoint. At a 101° C. polymerization temperature, the $F_{50}$ 100 wt % Igepal ESCR was 99 hrs, which increased to 123 hrs at a polymerization temperature of 98° C. The corresponding catalyst productivities at 200 psi ethylene partial pressures and about 3.0 hr residence times in the reactor were greater than 6300 lb/lb. The reactor operated well with no instances of resin agglomeration or disruption to the polymerization process.

In Example 18 with catalyst activated at 600° C. setpoint, the catalyst productivity was increased from 6350 to 8670 lb/lb compared to Example 17 by increasing the ethylene partial pressure from 200 to 250 psi with no decrease in the $F_{50}$ 10 wt % Igepal ESCR. The $F_{50}$ 100 wt % Igepal ESCR increased from 123 to 175 hr. The reactor continued to operate well at the higher ethylene partial pressure.

In Example 19, an approximate tripling of the TEAl feed to the reactor compared with Example 17 corresponded to an $F_{50}$ 10 wt % Igepal ESCR of 66 hr compared with 48 hr. Example 19 exhibited relatively broad molecular weight distribution with Mw/Mn=31.5. In this example it was demonstrated that molecular weight distribution of the polymer could be increased by the addition of TEAl modifier.

In Example 20 the TEAl addition was discontinued, and the $F_{50}$ 10 wt % Igepal ESCR was 47 hrs, essentially the same as that of Example 17 for which TEAl was present at a 0.22 TEAl/Cr mole ratio. This result demonstrated that the TEAl modifier was not needed to achieve the results obtained using a combination of catalyst activated at lower temperatures with lower reaction temperatures, which provided a polymer with high ESCR values and a broadened molecular weight distribution.

In Example 21, the activation temperature was lowered to 550° C., and the polymerization temperature raised to 105° C. Surprisingly, the ESCR Index was 1.73 and the catalyst productivity was high at 10,221 lb./lb.

These examples illustrate, among other things, the surprising effect on ESCR of using a particular combination of catalyst activation temperature and polymerization temperature at high ethylene partial pressures in a fluidized-bed gas phase polymerization process, for polyethylene copolymers, which included ethylene units as well as other monomeric units. The high ESCR values were obtained using low activation temperature set points, e.g., 600° C., together with low polymerization reactor temperatures, e.g., 98° C. to 102° C. Consistent with that, intermediate ESCR values were obtained if the polymerization temperature was increased from its lowest value.

In examples 8 through 10 which employed catalysts activated at high temperatures and run at both high and low reaction temperatures, the polymers produced had percent die swell values ranging from 75.8 to 78.4. In examples 17 through 20 which employed catalysts activated at lower reaction temperatures and in which the processes were run at low reaction temperatures (both with and without aluminum alkyl present), the polymers produced had significantly higher percent die swell values ranging between 86.2 and 91.2. Moreover, higher ESCR values were obtained for the polymers produced in examples 17 through 20 when compared to ESCR values found in examples 8 through 10. This shows that polymers with improved ESCR performance can be obtained while at the same time increasing the percent die swell.

TABLE 1

|  | Example | | | | |
| --- | --- | --- | --- | --- | --- |
|  | 1 | 2 | 3 | 4 | 5 |
| Activation temperature, ° C. | 825 | 825 | 825 | 825 | 825 |
| TEAl/Cr, mol/mol | 0.8 | 0.7 | 2.8 | 2.4 | 0.6 |
| Ethylene partial pressure, psi | 200 | 200 | 200 | 200 | 220 |
| $H_2/C_2$ gas mole ratio | 0.05 | 0.05 | 0.05 | 0.05 | 0.30 |
| $C_6/C_2$ gas mole ratio | 0.0015 | 0.0019 | 0.0016 | 0.0015 | 0.0013 |
| Oxygen addition, ppbv | 297 | 270 | 270 | 400 | 190 |
| Reactor temperature, ° C. | 106 | 106 | 106 | 106 | 105 |
| Residence time, hr | 4.0 | 3.7 | 3.3 | 4.0 | 2.5 |
| Catalyst productivity, lb/lb | 11,100 | 10,400 | 12,800 | 10,600 | 7,600 |
| Resin settled bulk density, lb/ft$^3$ | 21 | 21 | 22 | 20 | 23 |
| Resin average particle size, in | 0.023 | 0.022 | 0.029 | 0.023 | 0.022 |
| Resin fines, wt % | 2.6 | 3.1 | 1.4 | 2.3 | 2.3 |
| Polymer density, g/cc | 0.9542 | 0.9528 | 0.9521 | 0.9529 | 0.9553 |
| FI $I_{21}$, dg/min | 28.7 | 33.7 | 18.9 | 23.7 | 35.6 |
| MI $I_2$, dg/min | 0.29 | 0.36 | 0.16 | 0.21 | 0.44 |
| MFR $I_{21}/I_2$ | 99.0 | 94.9 | 121.2 | 110.7 | 80.9 |
| Mn | 11,400 | 11,900 | 14,800 | 13,400 | na |
| Mw | 121,800 | 125,900 | 149,600 | 130,400 | na |
| Mw/Mn | 10.7 | 10.6 | 10.1 | 9.7 | na |
| ESCR, 10% Igepal F50, hr | 38 | 39 | 34 | 32 | 28 |
| ESCR Index | 1.01 | 0.85 | 0.66 | 0.70 | 0.88 |
| ESCR, 100% Igepal F50 (hr-ml/g) | na | na | na | na | na |
| Percent Die Swell | na | na | na | na | na |
| Example | 1 | 2 | 3 | 4 | 5 |

TABLE 1-continued

|  | Example | | | | |
|---|---|---|---|---|---|
|  | 6 | 7 | 8 | 9 | 10 |
| Activation temperature, °C. | 825 | 825 | 825 | 825 | 825 |
| TEAl/Cr, mol/mol | 1.1 | 2.0 | 0.26 | 0.22 | 0.17 |
| Ethylene partial pressure, psi | 220 | 220 | 200 | 200 | 200 |
| $H_2/C_2$ gas mole ratio | 0.30 | 0.30 | 0.050 | 0.050 | 0.057 |
| $C_6/C_2$ gas mole ratio | 0.0012 | 0.0010 | 0.00085 | 0.00093 | 0.00095 |
| Oxygen addition, ppbv | 190 | 290 | 90 | 400 | 383 |
| Reactor temperature, °C. | 105 | 105 | 105 | 101 | 100 |
| Residence time, hr | 2.4 | 2.5 | 3.0 | 2.8 | 2.7 |
| Catalyst productivity, lb/lb | 9,400 | 8,600 | 11,060 | 5,640 | 5,000 |
| Resin settled bulk density, lb/ft$^3$ | 23 | 22 | 25 | 23.1 | 23.4 |
| Resin average particle size, in | 0.025 | 0.023 | 0.034 | 0.024 | 0.026 |
| Resin fines, wt % | 1.4 | 1.7 | 0.6 | 1.3 | 0.9 |
| Polymer density, g/cc | 0.9533 | 0.9547 | 0.9538 | 0.9536 | 0.9537 |
| FI $I_{21}$, dg/min | 22.0 | 21.1 | 21.8 | 21.1 | 21.7 |
| MI $I_2$, dg/min | 0.22 | 0.18 | 0.21 | 0.18 | 0.19 |
| MFR $I_{21}/I_2$ | 100.0 | 117.2 | 103.5 | 116.7 | 117.0 |
| Mn | na | na | 15,023 | 10,167 | 9,799 |
| Mw | na | na | 167,504 | 156,349 | 145,161 |
| Mw/Mn | na | na | 11.1 | 15.4 | 14.8 |
| ESCR, 10% Igepal F50, hr | 42 | 24 | 24 | 39 | 28 |
| ESCR Index | 0.98 | 0.69 | 0.60 | 0.95 | 0.69 |
| ESCR, 100% Igepal F50 (hr-ml/g) | na | na | 42 | 54 | 58 |
| Percent Die Swell | na | na | 78.4 | 77.2 | 75.8 |
| Example | 6 | 7 | 8 | 9 | 10 | na = data not available

TABLE 2

|  | Example | | | | | |
|---|---|---|---|---|---|---|
|  | 11 | 12 | 13 | 14 | 15 | 16 |
| Activation temperature, °C. | 600 | 600 | 600 | 600 | 600 | 600 |
| TEAl/Cr, mol/mol | 0.3 | 0.3 | 0.30 | 0.4 | 0.24 | 0.2 |
| Ethylene partial pressure, psi | 200 | 200 | 200 | 200 | 200 | 200 |
| $H_2/C_2$ gas mole ratio | 0.05 | 0.045 | 0.051 | 0.05 | 0.05 | 0.05 |
| $C_6/C_2$ gas mole ratio | 0.0011 | 0.0017 | 0.00103 | 0.0016 | 0.0019 | 0.0007 |
| Oxygen addition, ppbv | Not Meas. | 140 | 240 | 330 | 187 | 233 |
| Reactor temperature, °C. | 106 | 102 | 101 | 98 | 98 | 98 |
| Residence time, hr | 2.5 | 4.6 | 2.7 | 2.5 | 2.6 | 2.5 |
| Catalyst productivity, lb/lb | 8,800 | 8,900 | 7,800 | 5,400 | 7,200 | 6,500 |
| Resin settled bulk density, lb/ft$^3$ | 27 | 27 | 22.0 | 23 | 24 | 23 |
| Resin average particle size, in | 0.020 | 0.022 | 0.027 | 0.021 | 0.026 | 0.026 |
| Resin fines, wt % | 5.5 | 4.7 | 1.9 | 4.3 | 3.0 | 3.1 |
| Polymer density, g/cc | 0.9546 | 0.9552 | 0.9551 | 0.9554 | 0.9553 | 0.9570 |
| FI $I_{21}$, dg/min | 24.7 | 22.5 | 25.3 | 25.4 | 24.9 | 23.8 |
| MI $I_2$, dg/min | 0.24 | 0.20 | 0.23 | 0.21 | 0.23 | 0.21 |
| MFR $I_{21}/I_2$ | 102.9 | 113.6 | 110.8 | 121.0 | 109.6 | 113.2 |
| Mn | na | 9,271 | 7,912 | 9,676 | 7,418 | 7,863 |
| Mw | na | 229,627 | 185,953 | 167,682 | 187,414 | 204,613 |
| Mw/Mn | na | 24.8 | 23.5 | 17.3 | 25.3 | 26.0 |
| ESCR, 10% Igepal $F_{50}$, hr | 30 | 48 | 50 | 48 | 80 | 53 |
| ESCR Index | 0.85 | 1.49 | 1.53 | 1.53 | 2.52 | 2.15 |
| ESCR, 100% Igepal $F_{50}$, hr | na | 157 | 99 | 129 | 215 | 107 |
| Percent Die Swell | na | na | 86.4 | na | na | na |
| Example | 11 | 12 | 13 | 14 | 15 | 16 |

|  | Example | | | | |
|---|---|---|---|---|---|
|  | 17 | 18 | 19 | 20 | 21 |
| Activation temperature, °C. | 600 | 600 | 600 | 600 | 550 |
| TEAl/Cr, mol/mol | 0.22 | 0.30 | 0.69 | 0 | 0.37 |
| Ethylene partial pressure, psi | 200 | 250 | 199 | 200 | 201 |
| $H_2/C_2$ gas mole ratio | 0.052 | 0.053 | 0.054 | 0.050 | 0.05 |
| $C_6/C_2$ gas mole ratio | 0.00125 | 0.00129 | 0.00128 | 0.00127 | 0.00127 |
| Oxygen addition, ppbv | 222 | 190 | 370 | 221 | 131 |
| Reactor temperature, °C. | 98 | 98 | 98 | 98 | 105 |
| Residence time, hr | 2.8 | 3.0 | 2.9 | 2.8 | 2.808 |
| Catalyst productivity, lb/lb | 6,350 | 8,670 | 6,330 | 5,570 | 10,221 |
| Resin settled bulk density, lb/ft$^3$ | 23.4 | 23.4 | 22.6 | 24.9 | 24.3 |
| Resin average particle size, in | 0.026 | 0.030 | 0.025 | 0.024 | 0.0166 |

TABLE 2-continued

| | | | | | |
|---|---|---|---|---|---|
| Resin fines, wt % | 1.8 | 0.6 | 1.6 | 2.3 | 4.64 |
| Polymer density, g/cc | 0.9541 | 0.9547 | 0.9541 | 0.9534 | 0.9547 |
| FI $I_{21}$, dg/min | 23.4 | 22.2 | 21.3 | 22.2 | 23.94 |
| MI $I_2$, dg/min | 0.20 | 0.18 | 0.15 | 0.19 | 0.27 |
| MFR $I_{21}/I_2$ | 119.3 | 125.9 | 142.0 | 117.6 | 88.7 |
| Mn | 7,367 | 7,391 | 5,559 | 8,213 | 7,817 |
| Mw | 176,827 | 181,258 | 175,367 | 157,650 | 162,638 |
| Mw/Mn | 24.0 | 24.5 | 31.5 | 19.2 | 21.0 |
| ESCR, 10% Igepal $F_{50}$, hr | 48 | 52 | 66 | 47 | 60 |
| ESCR Index | 1.26 | 1.5 | 1.74 | 1.11 | 1.73 |
| ESCR, 100% Igepal $F_{50}$, hr | 123 | 175 | 206 | 123 | 219 |
| Percent Die Swell | 87.1 | 89.3 | 91.2 | 86.2 | 94.7 |
| Example | 17 | 18 | 19 | 20 | 20 | na = data not available

What is claimed is:

1. A continuous gas-phase polymerization process for making a high strength, high density polyethylene copolymer, comprising: contacting monomers that include ethylene and optionally at least one non-ethylene olefin with fluidized catalyst particles in a gas-phase fluidized-bed reactor in the presence of hydrogen gas at an ethylene partial pressure of 100 psi or more to produce a polyethylene copolymer resin, wherein:

(a) the catalyst particles include silica, chromium, and titanium, wherein the silica support is porous and has a surface area of less than 400 square meters per gram;

(b) the catalyst particles have been prepared by contacting the silica support with a chromium compound in a vessel; raising the internal temperature of the vessel containing the dried particles and dry air to a final activation temperature of 650° C. or below; maintaining the activation temperature for a period of from 4 to 8 hours to form activated catalyst particles; lowering the internal temperature of the vessel containing the activated catalyst particles; removing air from the vessel using dry nitrogen; and wherein after activation, the supported catalyst particles contain from about 0.1 to about 0.7 weight percent of Cr and from about 1.5 to 9.0 weight percent of titanium, based on the combined weight of the support and the chromium and the titanium;

(c) the polyethylene resin is formed at a polymerization temperature of 120° C. or less;

(d) the polyethylene resin is formed with a bulk density of 20 lb/ft3 or more;

(e) the polyethylene resin has an ESCR Index of 1.0 or more;

(f) the polyethylene resin has a density of from 0.945 to 0.965 g/cc;

(g) the polyethylene resin has a Molecular Weight Distribution of from 15 to 30.

2. The continuous fluidized-bed gas-phase polymerization process of claim 1, wherein the polyethylene has a Die Swell of from 80% to 100%.

3. The process of claim 1, wherein the ESCR Index is 1.7 or greater.

4. The process of claim 1, wherein the density of the polyethylene copolymer is from 0.950 to 0.965 g/cc.

5. The process of claim 1, wherein the polyethylene copolymer has an ESCR Index of 1.8 or more.

6. The process of claim 1 wherein raising the internal temperature of the vessel containing the dried particles to a final activation temperature of 650° C. or below includes raising the internal temperature of the vessel containing the dried particles and dry air at a rate of from 25 to 55° C. per hour to the final activation temperature and the polyethylene resin is formed at a polymerization temperature of 115° C. or less.

7. The process of claim 1 wherein raising the internal temperature of the vessel containing the dried particles to a final activation temperature of 600° C. or below includes raising the internal temperature of the vessel containing the dried particles and dry air at a rate of from 25 to 55 C per hour to the final activation temperature and the polyethylene resin is formed at a polymerization temperature of 114° C. or less.

8. The process of claim 1 wherein the polyethylene resin has a Percent Die Swell of 80% or more.

9. The process of claim 1, wherein the polyethylene resin has a Percent Die Swell of 85% or more.

10. The process of claim 1, wherein the polyethylene copolymer has an ESCR Index of 1.9 or more.

11. The process of claim 1, wherein the non-ethylene monomer is 1-butene, 1-hexene, or 1-octene, or mixtures thereof.

12. The process of claim 1, wherein the ethylene partial pressure is 150 psi or greater.

13. The process of claim 1, wherein the catalyst productivity is 4000 lb/lb or more.

14. The process of claim 1, wherein the catalyst productivity is 4000 lb/lb or more with a residence time of 2 hours or more.

15. The process of claim 1, wherein the $H_2/C_2$ molar ratio in the cycle gas is 0.01 or more.

16. The process of claim 1, wherein the monomers are directed through a reactor that includes at least a first section having a first diameter and a second section having a second diameter, wherein the second diameter is larger than the first diameter.

17. The process of claim 1, wherein oxygen is present in the range of from about 0 to 500 ppbv based on the ethylene feed rate.

18. The process of claim 1, wherein the polyethylene resin is formed with a bulk density of 23 lb/ft$^3$ or more.

19. The process of cairn 1, wherein the density of the polyethylene copolymer is from 0.950 to (1960 g/cc.

20. The process of claim 1, wherein oxygen is present in the range of from about 10 to 500 ppbv based on the ethylene feed rate.

21. The process of claim 1, wherein the ESCR Index is 1.5 or greater.

22. The process of claim 1, wherein the polymerization is conducted in the presence of trialkyl aluminum.

* * * * *